United States Patent
Lin et al.

(10) Patent No.: US 9,678,395 B1
(45) Date of Patent: Jun. 13, 2017

(54) ARRAY SUBSTRATE AND CURVED LIQUID CRYSTAL DISPLAY PANEL

(71) Applicant: AU Optronics Corporation, Hsin-Chu (TW)

(72) Inventors: Gang-Yi Lin, Hsin-Chu (TW); Ya-Ling Hsu, Hsin-Chu (TW); Chen-Hsien Liao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/274,216

(22) Filed: Sep. 23, 2016

(30) Foreign Application Priority Data

Mar. 18, 2016 (TW) .............................. 105108426 A (51) Int. Cl.
*G02F 1/1343* (2006.01)
*G02F 1/1335* (2006.01)
*G02F 1/1362* (2006.01)
*G02F 1/137* (2006.01)
*G02F 1/1368* (2006.01)

(52) U.S. Cl.
CPC ........ *G02F 1/134309* (2013.01); *G02F 1/137* (2013.01); *G02F 1/1368* (2013.01); *G02F 1/133512* (2013.01); *G02F 1/136286* (2013.01); *G02F 2001/134345* (2013.01); *G02F 2201/121* (2013.01); *G02F 2201/123* (2013.01); *G02F 2201/56* (2013.01)

(58) Field of Classification Search
CPC ......... G02F 1/134309; G02F 1/133512; G02F 1/136286; G02F 1/137; G02F 1/1368
See application file for complete search history.

(56) References Cited

U.S. PATENT DOCUMENTS 7,999,879 B2    8/2011  Yoshida et al.
2015/0036073 A1  2/2015  Im et al.

FOREIGN PATENT DOCUMENTS

| CN | 104345500 A | 2/2015 |
|---|---|---|
| CN | 104570517 | 4/2015 |
| JP | 2008-15228 A | 1/2008 |
| KR | 10-2015-0029436 A | 3/2015 |

OTHER PUBLICATIONS

Taiwan Intellectual Property Office, "Office Action", issued on Oct. 26, 2016.

*Primary Examiner* — Joseph L Williams
(74) *Attorney, Agent, or Firm* — WPAT, PC (57) ABSTRACT

An array substrate includes a plurality of pixel regions and a plurality of pixel electrodes. Each pixel region includes a first sub-pixel region and a second sub-pixel region. Each pixel electrode includes a first electrode disposed in the first sub-pixel region and a second electrode disposed in the second sub-pixel region. The first electrode includes a first main electrode dividing the first sub-pixel region into a first alignment region and a second alignment region. The second electrode includes a second main electrode dividing the second sub-pixel region into a third alignment region and a fourth alignment region. The first, the second, the third, and the fourth alignment regions are sequentially arranged in a first direction. The first electrode and the second electrode are separated by a gap, and a width of the gap in the first direction is less than a width of one of the first, the second, the third, and the fourth alignment regions in the first direction.

20 Claims, 10 Drawing Sheets

ARRAY SUBSTRATE AND CURVED LIQUID CRYSTAL DISPLAY PANEL

BACKGROUND

Technical Field

The present invention relates to an array substrate and a liquid crystal display panel, and more particularly, to an array substrate having multiple alignment regions and a curved liquid crystal display panel.

Related Art

With the ongoing development of liquid crystal display technologies, liquid crystal display panels have found wide application in flat-screen televisions, notebook computers, mobile phones and various types of consumer electronic products. A conventional liquid crystal display panel is a flat display panel formed of an active array substrate and a color filter substrate sandwiched with a liquid crystal material. However, to further improve a viewing effect and sense of presence for a viewer, at present a curved display is also developed in the related industry to achieve such an effect. When a liquid crystal display panel is curved, different stresses are generated in local regions on a glass substrate to cause phase retardation. In addition, when the liquid crystal display panel is curved, an electrode and a light-shielding pattern on the substrate also have relative displacements; however, displacements in the local regions are inconsistent; as a result, light leakages caused in the local regions are different, further causing a phenomenon of an overall uneven light leakage (mura), and such a phenomenon has severely adverse impact on display quality of a curved liquid crystal display.

SUMMARY

A main objective of the present invention is to provide an array substrate and a curved liquid crystal display panel, which improve display brightness uniformity and transmittance by using a manner of adjusting a setting of each alignment region in a pixel region; moreover, the array substrate may be applied to a curved liquid crystal display panel to mitigate a phenomenon of a nonuniform light leakage that occurs because the panel is curved.

To achieve the foregoing objectives, the present invention provides an array substrate, including a substrate, a plurality of signal lines, a plurality of pixel regions, and a plurality of pixel electrodes. The signal lines are disposed on the substrate, and the signal lines extend in a first direction. The pixel regions are disposed on the substrate. Each pixel region includes a first sub-pixel region and a second sub-pixel region, and the first sub-pixel region and the second sub-pixel region are arranged in the first direction. The pixel electrodes are disposed on the substrate and are correspondingly disposed in the pixel regions respectively, and each pixel electrode includes a first electrode and a second electrode. The first electrode is disposed in the first sub-pixel region, the first electrode includes a first main electrode extending in a second direction, and the first main electrode divides the first sub-pixel region into a first alignment region and a second alignment region. The second electrode is disposed in the second sub-pixel region, the second electrode includes a second main electrode extending in the second direction, and the second main electrode divides the second sub-pixel region into a third alignment region and a fourth alignment region. The first, the second, the third, and the fourth alignment regions are sequentially arranged in the first direction, and alignment directions of the first, the second, the third, and the fourth alignment regions are mutually different. The first electrode and the second electrode are separated by a gap, and a width of the gap in the first direction is less than a width of one of the first, the second, the third, and the fourth alignment regions in the first direction.

To achieve the foregoing objective, the present invention provides a curved liquid crystal display panel, including an array substrate, an opposite substrate, a liquid crystal layer, and a common electrode. The array substrate includes a substrate, a plurality of signal lines, a plurality of pixel regions, and a plurality of pixel electrodes. The signal lines are disposed on the substrate, and the signal lines extend in a first direction. The pixel regions are disposed on the substrate, each pixel region includes a first sub-pixel region and a second sub-pixel region, and the first sub-pixel region and the second sub-pixel region are arranged in the first direction. The pixel electrodes are disposed on the substrate and are correspondingly disposed in the pixel regions respectively, and each pixel electrode includes a first electrode and a second electrode. The first electrode is disposed in the first sub-pixel region, the first electrode includes a first main electrode extending in a second direction, and the first main electrode divides the first sub-pixel region into a first alignment region and a second alignment region. The second electrode is disposed in the second sub-pixel region, the second electrode includes a second main electrode extending in the second direction, and the second main electrode divides the second sub-pixel region into a third alignment region and a fourth alignment region. The first, the second, the third, and the fourth alignment regions are sequentially arranged in the first direction, and alignment directions of the first, the second, the third, and the fourth alignment regions are mutually different. The first electrode and the second electrode are separated by a gap, and a width of the gap in the first direction is less than a width of one of the first, the second, the third, and the fourth alignment regions in the first direction. The opposite substrate and the array substrate are disposed opposite, the liquid crystal layer is disposed between the array substrate and the opposite substrate, and the liquid crystal layer includes a plurality of liquid crystal molecules. The common electrode is disposed on the opposite substrate, and the common electrode is disposed between the liquid crystal layer and the opposite substrate.

DETAILED DESCRIPTION

To make a person of ordinary skill in the technical field of the present invention further understand the present invention, the formation content and the efficacy to achieve of the present invention are described below in detail with reference to the preferred embodiments of the present invention and the accompanying drawings.

Figure 1:
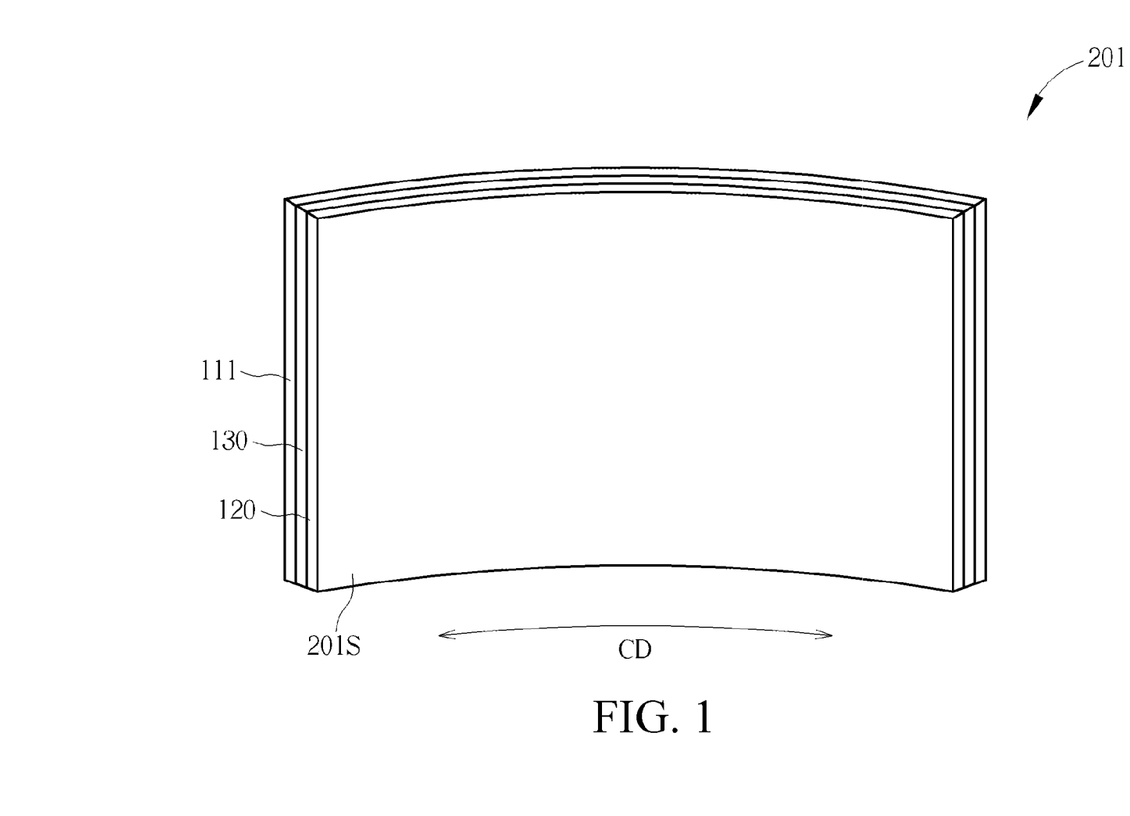
FIG. 1 is a schematic 3D view of a curved liquid crystal display panel according to a first embodiment of the present invention.
Figure 2:
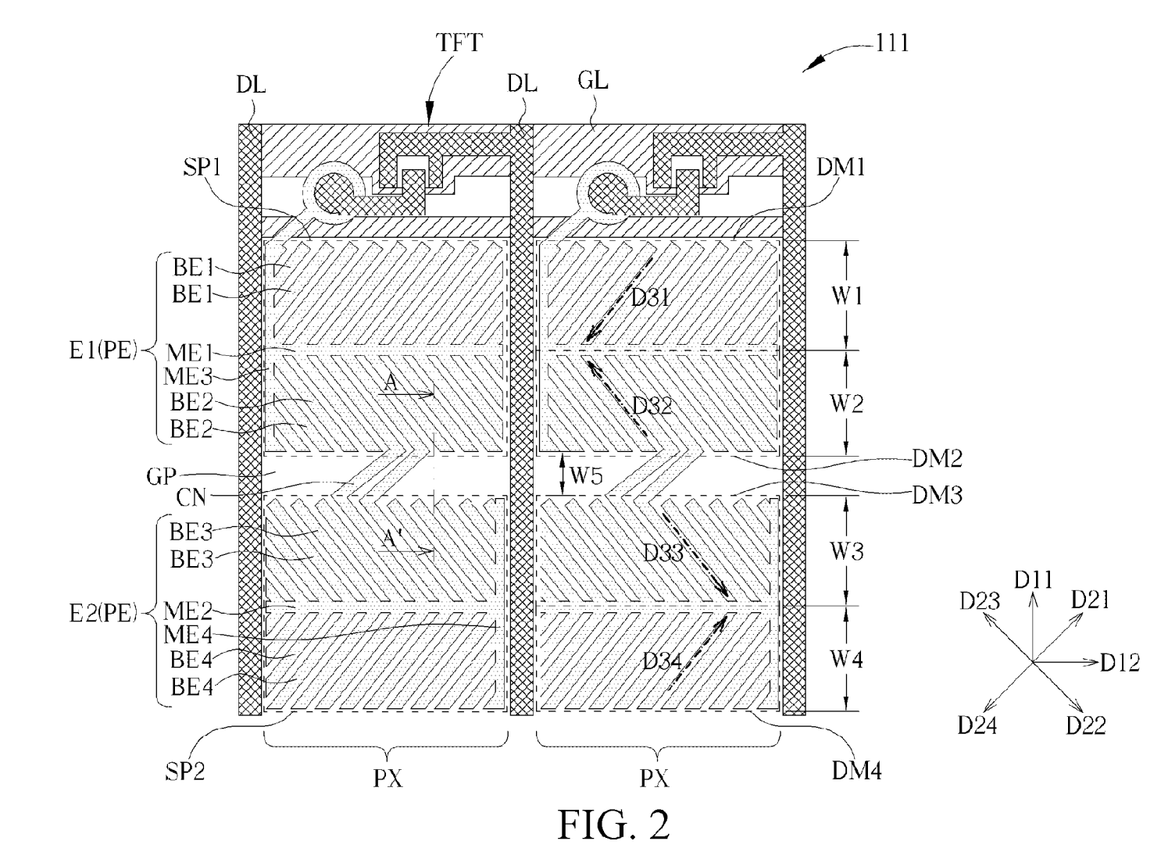
FIG. 2 is a schematic view of an array substrate according to the first embodiment of the present invention.
Figure 3:
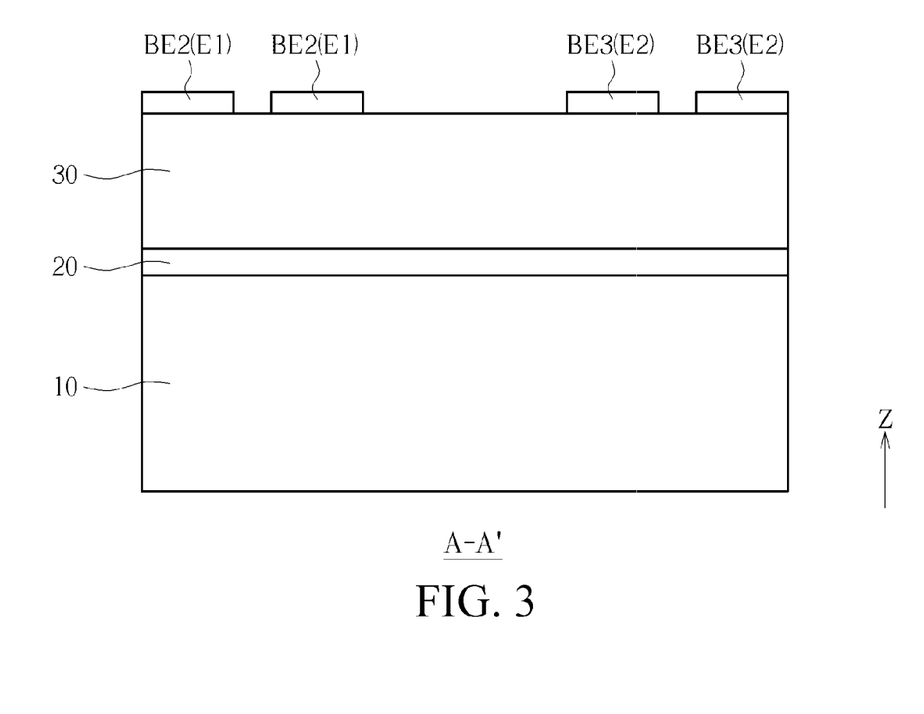
FIG. 3 is a schematic sectional view drawn along a sectional line A-A' in FIG. 2.
Figure 4:
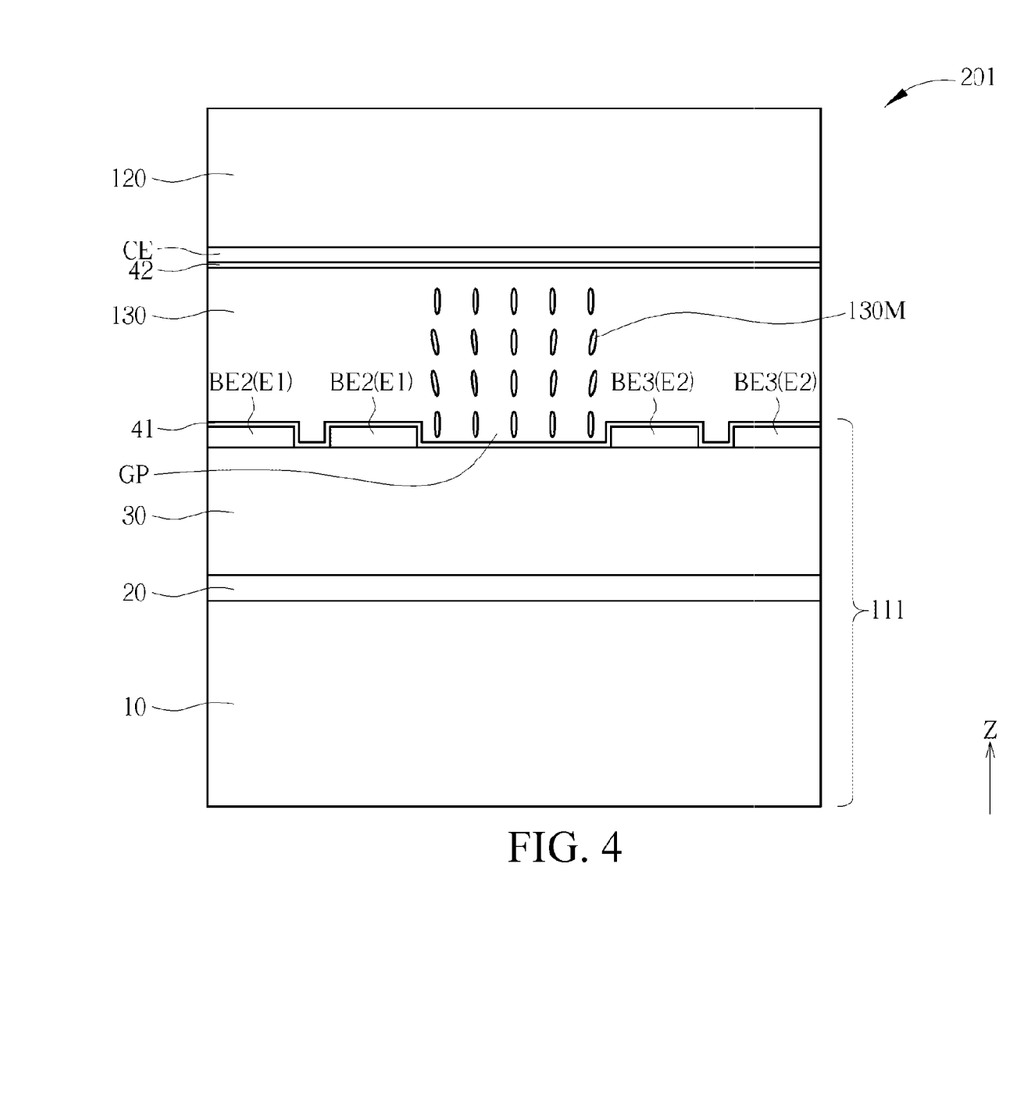
FIG. 4 is a schematic view of the curved liquid crystal display panel according to the first embodiment of the present invention.
Figure 5:
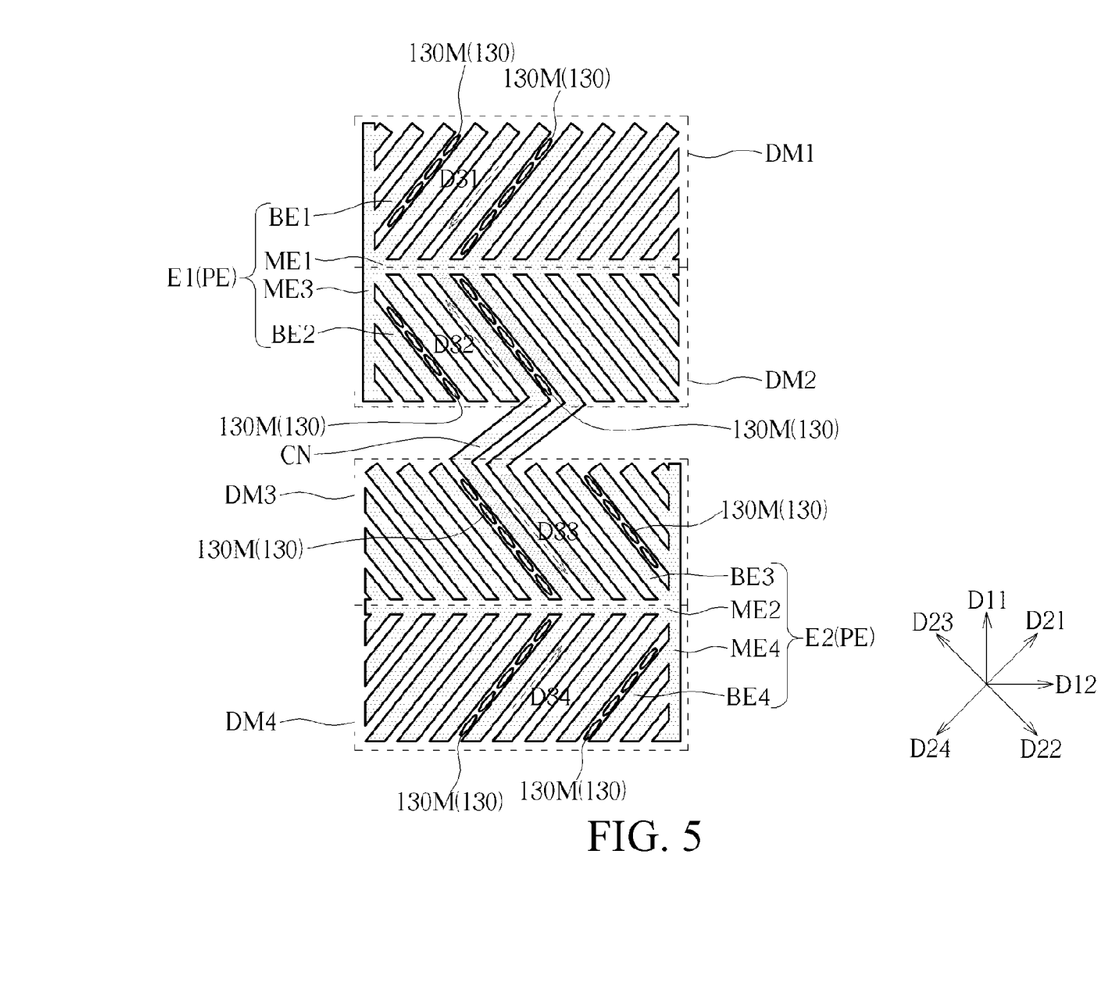
FIG. 5 is a schematic view of inclination directions of liquid crystal molecules in the curved liquid crystal display panel according to the first embodiment of the present invention.

Refer to FIG. 1 to FIG. 5. FIG. 1 is a schematic 3D view of a curved liquid crystal display panel according to a first embodiment of the present invention. FIG. 2 is a schematic view of an array substrate according to this embodiment. FIG. 3 is a schematic sectional view drawn along a sectional line A-A' in FIG. 2. FIG. 4 is a schematic view of the curved liquid crystal display panel in this embodiment (FIG. 4 may be seen as a schematic sectional view of the curved liquid crystal display panel corresponding to the position in FIG. 3). FIG. 5 is a schematic view of inclination directions of liquid crystal molecules in the curved liquid crystal display panel according to this embodiment. For ease of description, the accompanying drawings of the present invention are only exemplary to make it easier to understand the present invention, and specific proportions in the accompanying drawings can be adjusted according to a design requirement. As shown in FIG. 1 to FIG. 4, this embodiment provides a curved liquid crystal display panel 201. The curved liquid crystal display panel 201 includes an array substrate 111, an opposite substrate 120, a liquid crystal layer 130, and a common electrode CE. The opposite substrate 120 and the array substrate 111 are disposed opposite, the liquid crystal layer 130 is disposed between the array substrate 111 and the opposite substrate 120, and the liquid crystal layer 130 includes a plurality of liquid crystal molecules 130M. The common electrode CE is disposed on the opposite substrate 120, and the common electrode CE is disposed between the liquid crystal layer 130 and the opposite substrate 120. The opposite substrate 120 may include a color filter substrate or a simple transparent substrate. The array substrate 111 may also include a color filter on an array (COA) substrate, but is not limited thereto. The curved liquid crystal display panel 201 is curved in a curved direction CD and has a radius of curvature being approximately between 2500 millimeters and 6000 millimeters, but is not limited thereto. The curved liquid crystal display panel 201 has a display surface 201S, and the display surface 201S is a curved arc surface. It should be noted that this embodiment is described by using a case in which the array substrate 111 is applied to the curved liquid crystal display panel 201, for the array substrate of the present invention, the present invention is not limited to application to a curved liquid crystal display panel, and in another embodiment of the present invention, and the array substrate 111 may also be applied to another flat liquid crystal display panel.

As shown in FIG. 2 and FIG. 3, the array substrate 111 includes a substrate 10, a plurality of signal lines (for example, data lines DL), a plurality of pixel regions PX, and a plurality of pixel electrodes PE. The substrate 10 may include a rigid substrate such as a glass substrate and a ceramic substrate or a flexible substrate such as a plastic substrate or a substrate made of another suitable material. The data lines DL are disposed on the substrate 10, and the data lines DL extend in a first direction D11. The pixel regions PX are disposed on the substrate 10, each pixel region PX includes a first sub-pixel region SP1 and a second sub-pixel region SP2, and the first sub-pixel region SP1 and the second sub-pixel region SP2 are arranged in the first direction D11. The pixel electrodes PE are disposed on the substrate 10 and are correspondingly disposed in the pixel regions PX respectively, and each pixel electrode PE includes a first electrode E1 and a second electrode E2. The first electrode E1 is disposed in the first sub-pixel region SP1, the first electrode E1 includes a first main electrode ME1 extending in a second direction D12, and the first direction D11 and the second direction D12 may be substantially orthogonal, but is not limited thereto. Two adjacent data lines DL are located on two sides of one pixel region PX in the second direction D12. The first main electrode ME1 divides the first sub-pixel region SP1 into a first alignment region DM1 and a second alignment region DM2. The second electrode E2 is disposed in the second sub-pixel region SP2, the second electrode E2 includes a second main electrode ME2 extending in the second direction D12, and the second main electrode ME2 divides the second sub-pixel region SP2 into a third alignment region DM3 and a fourth alignment region DM4. The first alignment region DM1, the second alignment region DM2, the third alignment region DM3, and the fourth alignment region DM4 are sequentially arranged in the first direction D11, and alignment directions of the first alignment region DM1, the second alignment region DM2, the third alignment region DM3, and the fourth alignment region DM4 are mutually different. The first electrode E1 and the second electrode E2 are separated by a gap GP, and a width (for example, a fifth width W5 shown in FIG. 2) of the gap GP in the first direction D11 is less than a width (for example, a first width W1, a second width W2, a third width W3 or fourth width W4 shown in FIG. 2) of one of the first alignment region DM1, the second alignment region DM2, the third alignment region DM3, and the fourth alignment region DM4 in the first direction D11. In this embodiment, each pixel region PX includes alignment regions (the first alignment region DM1, the second alignment region DM2, the third alignment region DM3, and the fourth alignment region DM4) in four different alignment directions, and therefore can be seen as a 4-domain wide-viewing-angle structure, but is not limited thereto.

As shown in FIG. 1 to FIG. 4, in each pixel region PX, the alignment regions in four different alignment directions are sequentially arranged in directions that are substantially parallel to the data lines DL; therefore, when the curved direction CD of the curved liquid crystal display panel 201 to which the array substrate 111 is applied is curved in the second direction D12, even if a particular degree of relative displacement occurs in the second direction D12 between the array substrate 111 and the opposite substrate 120 or/and another member, the liquid crystal molecules 130M are still not twisted because of a matching error (which may be also referred to as misalignment), a dark region can be prevented. A phenomenon of a nonuniform light leakage of the curved liquid crystal display panel 201 that occurs when the panel is curved can be mitigated. In addition, by means of a setting of the gap GP having a particular width (for example, the fifth width W5 needs to be greater than 8 microns, but is not limited thereto), mutual impact on liquid crystal orientations between the second alignment region DM2 and the third alignment region DM3 can be reduced, thereby achieving objectives of improving display brightness uniformity and transmittance.

It should be further described that as shown in FIG. 2 to FIG. 5, in the array substrate 111, the first electrode E1 may further include a plurality of first branch electrodes BE1 and a plurality of second branch electrodes BE2, and the second electrode E2 may further include a plurality of third branch electrodes BE3 and a plurality of fourth branch electrodes BE4. The first branch electrodes BE1 are disposed in the first alignment region DM1, the second branch electrodes BE2 are disposed in the second alignment region DM2, the third branch electrodes BE3 are disposed in the third alignment region DM3, and the fourth branch electrodes BE4 are disposed in the fourth alignment region DM4. An end of the first branch electrode BE1 is connected to the first main electrode ME1 and the other end is far away from the first main electrode ME1, and the first branch electrodes BE1 extends in a third direction D21. An end of the second branch electrode BE2 is connected to the first main electrode ME1 and the other end is far away from the first main electrode ME1, and the second branch electrodes BE2 extend in a fourth direction D22. The foregoing third direction D21 is preferably different from the fourth direction D22, and at least one of the first branch electrodes BE1 and one second branch electrode BE2 are disposed correspondingly and form a V-shaped structure, but is not limited thereto. In addition, an end of the third branch electrode BE3 is connected to the second main electrode ME2 and the other end is far away from the second main electrode ME2, and the third branch electrodes BE3 extend in a fifth direction D23. An end of the fourth branch electrode BE4 is connected to the second main electrode ME2 and the other end is far away from the second main electrode ME2, and the fourth branch electrodes BE4 extend in a sixth direction D24. The foregoing fifth direction D23 is preferably different from the sixth direction D24, and at least one of the third branch electrodes BE3 and one fourth branch electrode BE4 are disposed correspondingly and form another V-shaped structure, but is not limited thereto. It should be noted that the foregoing third direction D21, fourth direction D22, fifth direction D23, and sixth direction D24 are preferably different from each other, thereby further forming the foregoing alignment regions in four different alignment directions. For example, the third direction D21 and the sixth direction D24 may be parallel and opposite each other, and the fourth direction D22 and the fifth direction D23 may be parallel and opposite each other, but the present invention is not limited thereto. In addition, the first branch electrodes BE1 and the second branch electrodes BE2 may be mirror symmetric along the first main electrode ME1, and the third branch electrodes BE3 and the fourth branch electrodes BE4 may be mirror symmetric along the second main electrode ME2, but the present invention is not limited thereto. In addition, a reflected pattern of the first electrode E1 along the data lines DL may be the same as a pattern of the second electrode E2; however, the present invention is not limited thereto. It should be noted that electrode shapes of the first alignment region DM1, the second alignment region DM2, the third alignment region DM3, and the fourth alignment region DM4 in this embodiment are not limited to the foregoing condition. In another embodiment of the present invention, electrodes distributed in another shape may also be used in the first sub-pixel region SP1 or/and the second sub-pixel region SP2 according to a requirement to form alignment regions having different alignment directions. For example, the first electrode E1 may further include a third main electrode ME3 extending in the first direction D11 and the third main electrode ME3 may be connected to the first main electrode ME1 to form a T-shaped structure, the second electrode E2 may further include a fourth main electrode ME4 extending in the first direction D11 and the fourth main electrode ME4 may be connected to the second main electrode ME2 to form another T-shaped structure, and the third main electrode ME3 and the fourth main electrode ME4 are structurally separate from each other; however, the present invention is not limited thereto.

The array substrate 111 in this embodiment may further include at least one thin-film transistor TFT and at least one connection line CN. The thin-film transistor TFT is disposed on the substrate 10 and is disposed in one pixel region PX, and the thin-film transistor TFT is electrically connected to the pixel electrodes PE in the pixel regions PX. The connection line CN is disposed on the substrate 10 and is electrically connected to the first electrode E1 and the second electrode E2 of the pixel electrodes PE. In other words, the first electrode E1 and the second electrode E2 in a same pixel region PX have equal levels, and a wide-viewing-angle display effect is achieved by forming alignment regions having different alignment directions. In addition, the first electrode E1, the second electrode E2, and the connection line CN may be an integrated structure formed by using a same patterning conductive layer such as a patterning indium tin oxide (ITO), but is not limited thereto. The connection line CN may have a material different from those of the first electrode E1 and the second electrode E2. It should be further described that the array substrate 111 may further include at least one gate line GL, a gate dielectric layer 20, and an interlayer dielectric layer 30. The gate line GL is connected to a gate of the thin-film transistor TFT; however, in a bottom gate structure, the gate dielectric layer 20 may be disposed on the gate line GL, the interlayer dielectric layer 30 may be disposed on the gate dielectric layer 20 in a vertical direction Z, and the first electrode E1 and the second electrode E2 may be disposed on the interlayer dielectric layer 30; however, the present invention is not limited thereto. In another embodiment of the present invention, another type of thin-film transistor TFT (for example, a top gate thin-film transistor) may also be used according to a requirement to adjust a stacking order of material layers.

As shown in FIG. 4 and FIG. 5, the curved liquid crystal display panel 201 may further include a first alignment film 41 disposed on the array substrate 111 and a second alignment film 42 disposed on the opposite substrate 120, so as to generate an alignment effect for the liquid crystal molecules 130M. It should be noted that the curved liquid crystal display panel 201 in this embodiment may form alignment regions having multiple different alignment directions by means of an electrode design of the foregoing array substrate 111 in combination with a polymer-stabilized alignment (PSA) technology. The curved liquid crystal display panel 201 may include a multi-domain-vertical-alignment (MVA) wide-viewing-angle liquid crystal display panel, but is not limited thereto. In the curved liquid crystal display panel 201, the liquid crystal molecules 130M are correspondingly disposed in the first alignment region DM1, the second alignment region DM2, the third alignment region DM3, and the fourth alignment region DM4, respectively. The liquid crystal molecules 130M of the first alignment region DM1 incline towards the first main electrode ME1 or/and the third main electrode ME3 in a first inclination direction D31, the liquid crystal molecules 130M of the second alignment region DM2 incline towards the first main electrode ME1 or/and the third main electrode ME3 in a second inclination direction D32, the liquid crystal molecules 130M of the third alignment region DM3 incline towards the second main electrode ME2 or/and the fourth main electrode ME4 in a third inclination direction D33, the liquid crystal molecules 130M of the fourth alignment region DM4 incline towards the second main electrode ME2 or/and the fourth main electrode ME4 in a fourth inclination direction D34. The first inclination direction D31, the second inclination direction D32, the third inclination direction D33, and the fourth inclination direction D34 are different from each other, so as to achieve a 4-domain wide-viewing-angle display effect. For example, a difference between an azimuth angle of the first inclination direction D31 and an azimuth angle of the fourth inclination direction D34 may be 170 degrees to 190 degrees, whereas a difference between an azimuth angle of the second inclination direction D32 and an azimuth angle of the third inclination direction D33 may be 170 degrees to 190 degrees. Preferably, a difference between the azimuth angle of the first inclination direction D31 and the azimuth angle of the fourth inclination direction D34 may be 180 degrees, a difference between the azimuth angle of the second inclination direction D32 and the azimuth angle of the third inclination direction D33 may be 180 degrees, a difference between the azimuth angle of the first inclination direction D31 and the azimuth angle of the second inclination direction D32 may be 90 degrees, and a difference between the azimuth angle of the third inclination direction D33 and the azimuth angle of the fourth inclination direction D34 may be 90 degrees; however, the present invention is not limited thereto.

As shown in FIG. 4, in the curved liquid crystal display panel 201, because the gap GP having a particular width is disposed between the first electrode E1 and the second electrode E2, mutual impact of electric fields, which are at an edge of the first electrode E1 and at an edge of the second electrode E2, on inclination directions of liquid crystal molecules can be reduced, thereby further achieving objectives of improving display brightness uniformity and transmittance.

Different embodiments of the present invention are described below, and to simplify description, the following description mainly focuses on different parts of the embodiments, and same parts are no longer described repeatedly. In addition, the same elements in the embodiments of the present invention are represented by the same reference numerals, so as to facilitate reference among the embodiments.

Figure 6:
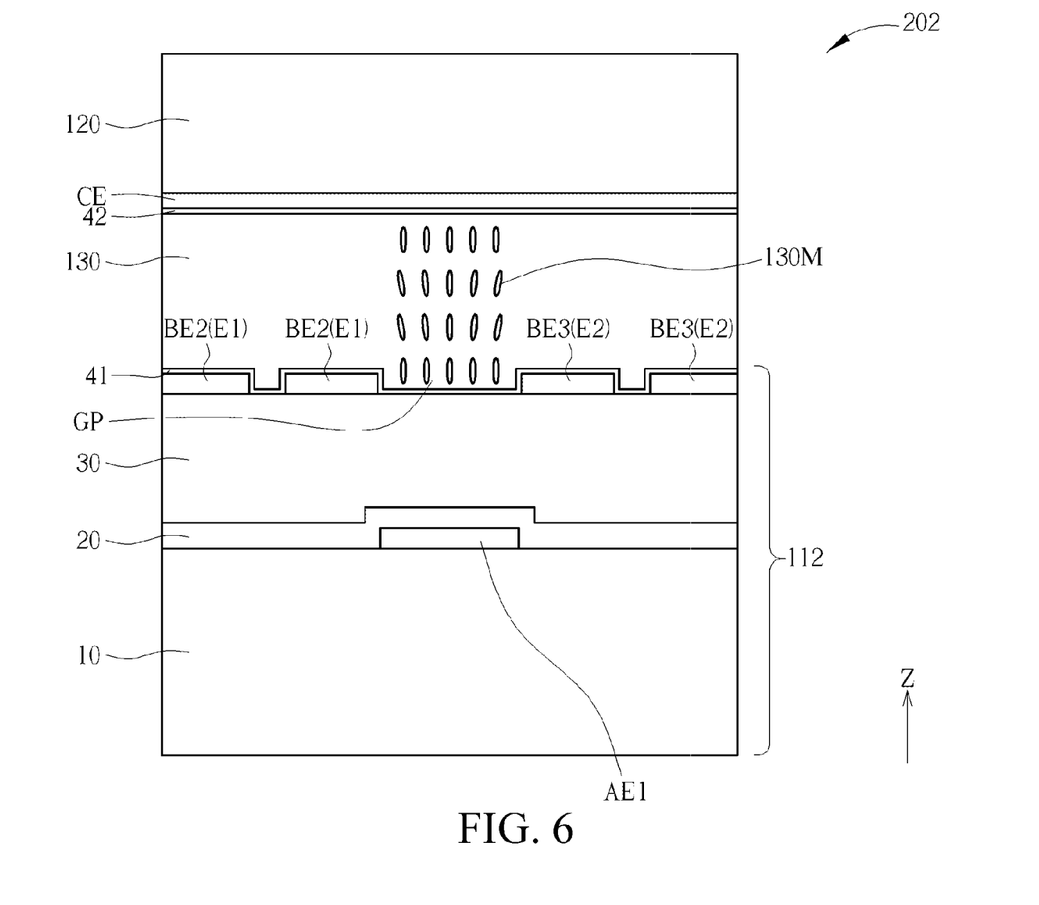
FIG. 6 is a schematic view of a curved liquid crystal display panel according to a second embodiment of the present invention.
Figure 7:
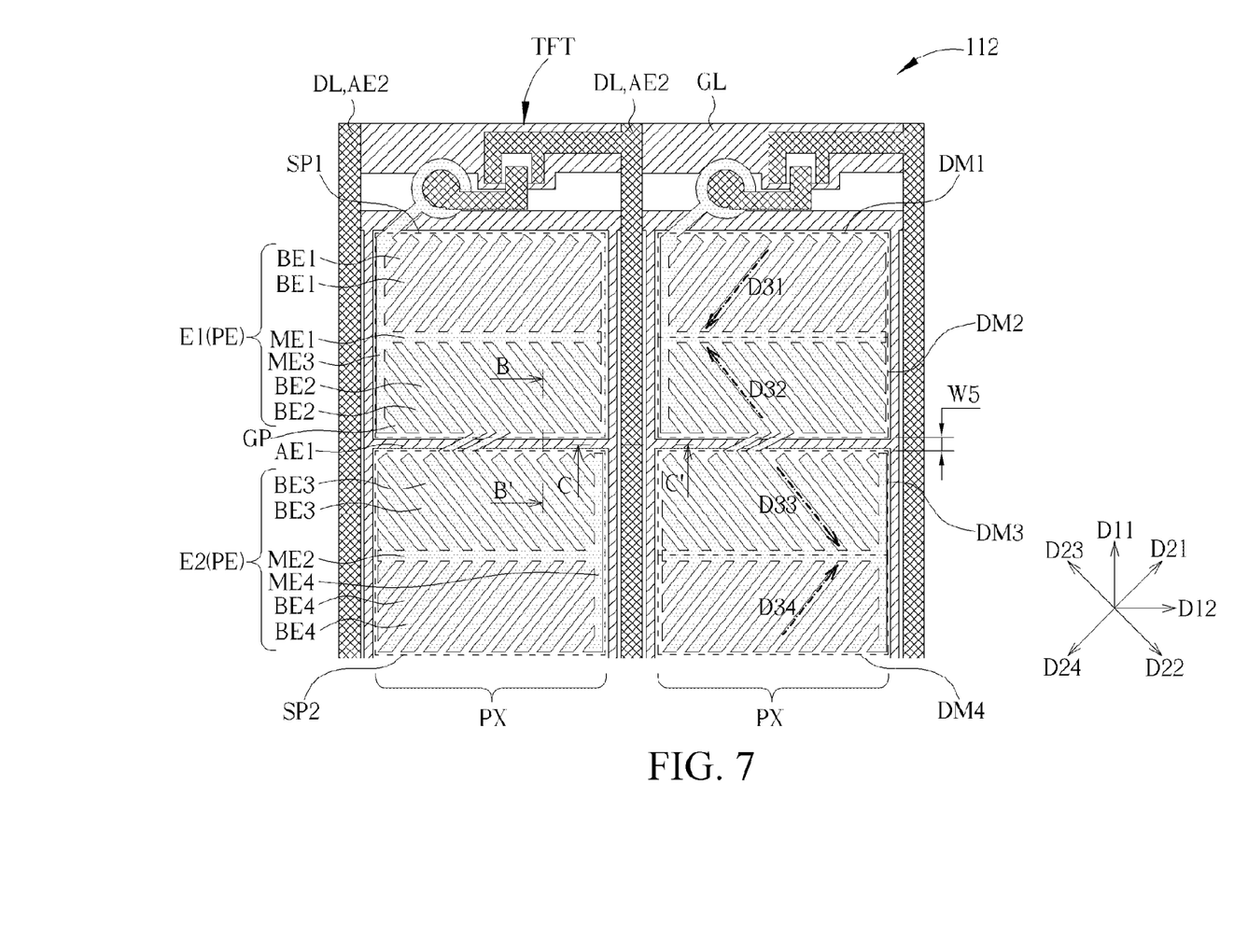
FIG. 7 is a schematic view of an array substrate according to the second embodiment of the present invention.
Figure 8:
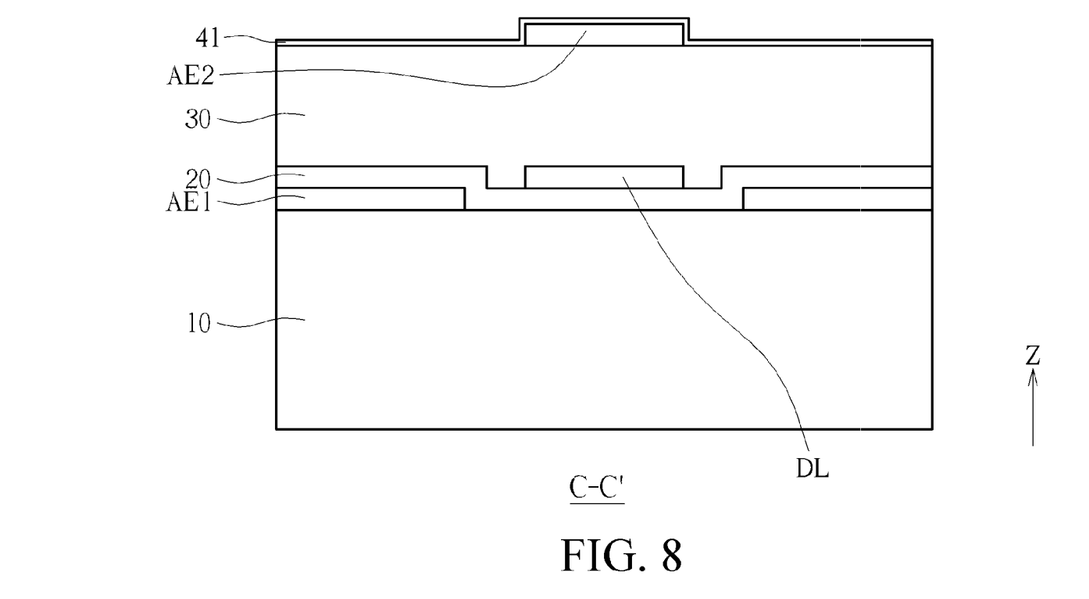
FIG. 8 is a schematic sectional view drawn along a sectional line C-C' in FIG. 7.

Refer to FIG. 6 to FIG. 8. FIG. 6 is a schematic view of a curved liquid crystal display panel 202 according to a second embodiment of the present invention. FIG. 7 is a schematic view of an array substrate 112 according to this embodiment. FIG. 8 is a schematic sectional view drawn along a sectional line C-C' in FIG. 7. The array substrate 112 in FIG. 6 may also be seen as a schematic sectional view drawn along a sectional line B-B' in FIG. 7. As shown in FIG. 6 to FIG. 8, differences from the foregoing first embodiment lie in that in this embodiment, the array substrate 112 may further include at least one first auxiliary electrode AE1 being disposed on the substrate 10 and disposed in one pixel region PX, the first auxiliary electrode AE1 is disposed between the first electrode E1 and the second electrode E2 in the first direction D11, and the first auxiliary electrode AE1 is separate from the pixel electrodes PE in the pixel regions PX. The first auxiliary electrode AE1 extends along the second direction D12. More specifically, a level of the first auxiliary electrode AE1 is preferably different from levels of the pixel electrodes PE. For example, a common voltage may be applied on the first auxiliary electrode AE1 to enhance an edge electric field, thereby reducing the occurrence of a disclination line and therefore shortening a width of the gap GP (for example, the fifth width W5 may be less than 8 microns, but is not limited thereto) to relatively achieve an effect of increasing an aperture ratio. In addition, the array substrate 112 or/and the curved liquid crystal display panel 202 may selectively further include at least one second auxiliary electrode AE2 disposed on one of the data lines DL, and the second auxiliary electrode AE is separate from the pixel electrodes PE. More specifically, a level of the second auxiliary electrode AE2 is also preferably different from the levels of the pixel electrodes PE, and a same level (for example, the foregoing common voltage) may be simultaneously applied on the second auxiliary electrode AE2 and the first auxiliary electrode AE1, but the present invention is not limited thereto.

Figure 9:
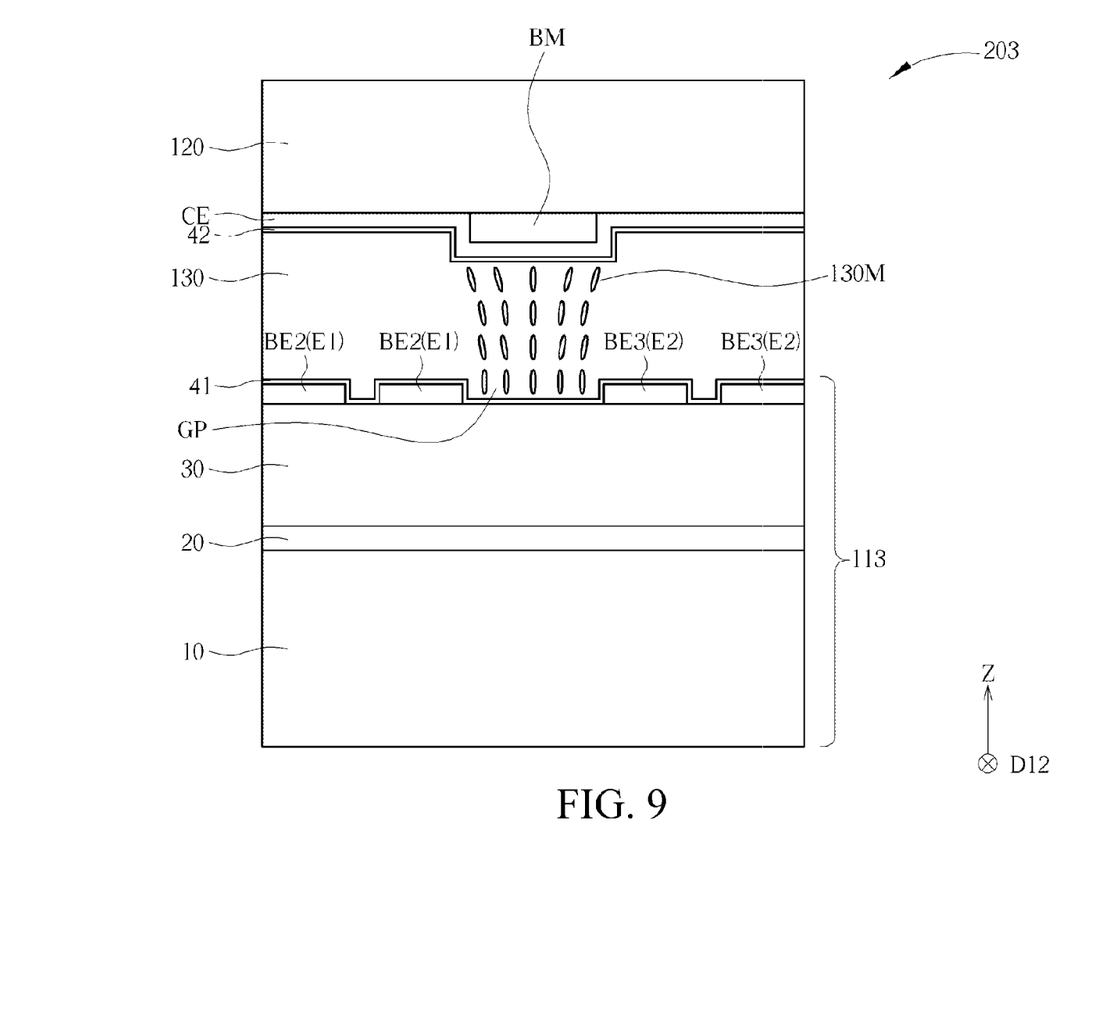
FIG. 9 is a schematic view of a curved liquid crystal display panel according to a third embodiment of the present invention.
Figure 10:
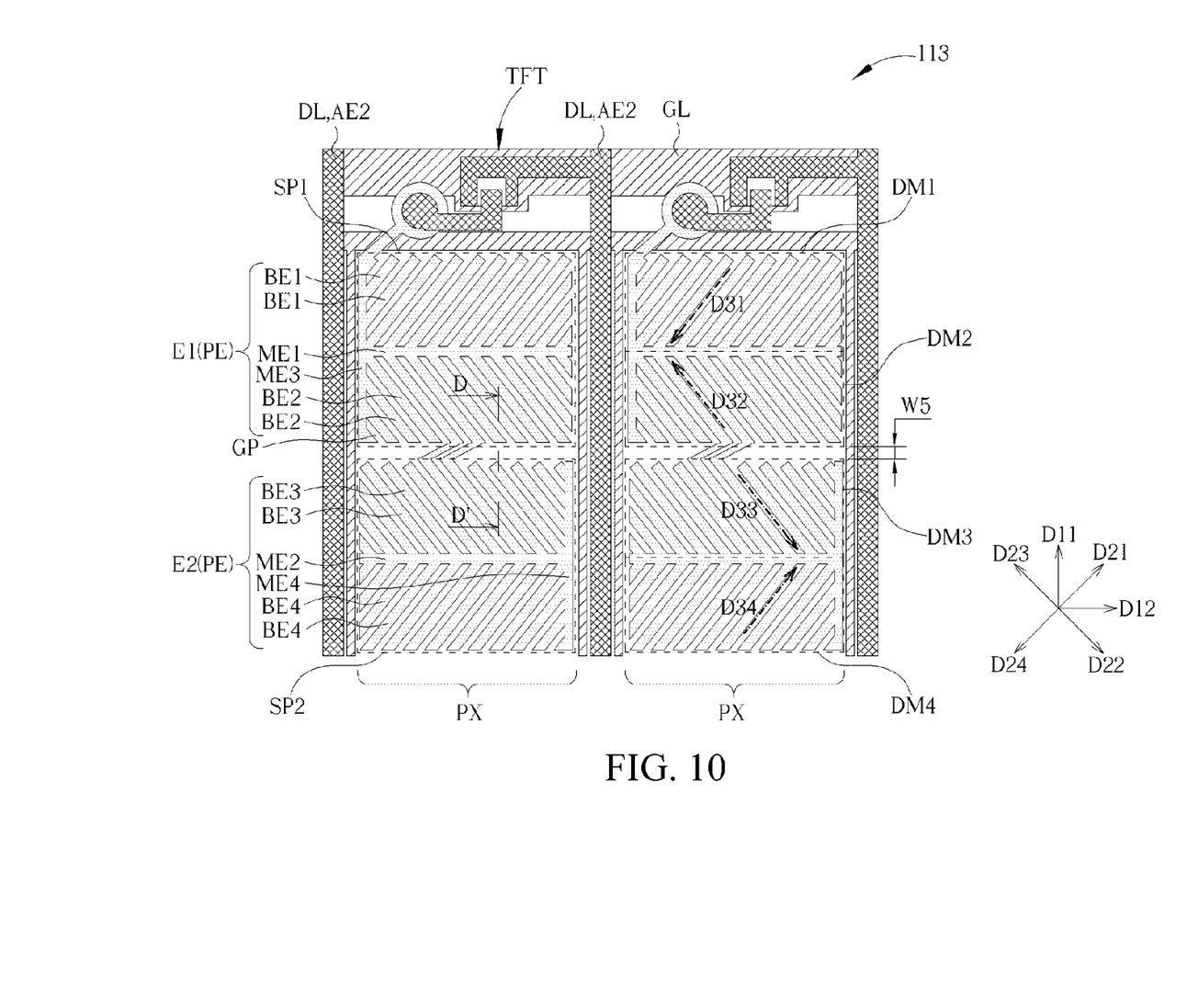
FIG. 10 is a schematic view of an array substrate according to the third embodiment of the present invention.

Refer to FIG. 9 and FIG. 10. FIG. 9 is a schematic view of a curved liquid crystal display panel 203 according to a third embodiment of the present invention. FIG. 10 is a schematic view of an array substrate 113 according to this embodiment. The array substrate 113 in FIG. 9 may also be seen as a schematic sectional view drawn along a sectional line D-D' in FIG. 10. As shown in FIG. 9 and FIG. 10, and differences from the foregoing first embodiment lie in that the curved liquid crystal display panel 203 may further include at least one light-shielding protrusion BM disposed on the opposite substrate 120, the light-shielding protrusion BM extends in the second direction D12, and the light-shielding protrusion BM is disposed corresponding to the gap GP located between the first electrode E1 and the second electrode E2. The light-shielding protrusion BM is disposed, so that a disclination line that is generated because of mutual impact of electric fields, which are at an edge of the first electrode E1 and at an edge of the second electrode E2, on inclination directions of liquid crystal molecules when the width of the gap GP is excessively small can be shielded. In other words, when the light-shielding protrusion BM is disposed, the width of the gap GP can be reduced (for example, the fifth width W5 can become less than 8 microns, but is not limited thereto) to relatively achieve an effect of increasing an aperture ratio.

In conclusion, in the array substrate and the curved liquid crystal display panel of the present invention, alignment regions in different alignment directions in one pixel region PX are sequentially arranged in directions substantially parallel to data lines, and therefore, when the curved liquid crystal display panel to which the array substrate is applied is curved, even if a relative displacement within a particular extent occurs between the array substrate and an opposite substrate or/and another member, liquid crystal molecules are still not twisted because of an misalignment, and a dark region can be prevented. A phenomenon of a nonuniform light leakage of the curved liquid crystal display panel that occurs when the panel is curved can be mitigated. In addition, a gap having a particular width is disposed between a first electrode and a second electrode and a first auxiliary electrode is disposed or a light-shielding protrusion is disposed corresponding to the gap, impact on display from a disclination line that is generated because of mutual impact of edge electric fields between the first electrode and the second electrode can be mitigated, thereby further achieving objectives of improving display brightness uniformity or/and transmittance.

The foregoing are merely preferred embodiments of the present invention, and any equivalent changes and modifications made according to the claims of the present invention shall fall within the scope of the present invention.

What is claimed is:

1. An array substrate, comprising:
   a substrate;
   a plurality of signal lines, disposed on the substrate, wherein the signal lines extend in a first direction;
   a plurality of pixel regions, disposed on the substrate, wherein each of the plurality of pixel regions comprises a first sub-pixel region and a second sub-pixel region, and the first sub-pixel region and the second sub-pixel region are arranged in the first direction; and
   a plurality of pixel electrodes, disposed on the substrate, and correspondingly disposed in the pixel regions respectively, wherein each of the plurality of pixel electrodes comprises:
      a first electrode, disposed in the first sub-pixel region, wherein the first electrode comprises a first main electrode extending in a second direction, and the first main electrode divides the first sub-pixel region into a first alignment region and a second alignment region; and
      a second electrode, disposed in the second sub-pixel region, wherein the second electrode comprises a second main electrode extending in the second direction, the second main electrode divides the second sub-pixel region into a third alignment region and a fourth alignment region, the first, the second, the third, and the fourth alignment regions are sequentially arranged in the first direction, and alignment directions of the first, the second, the third, and the fourth alignment regions are mutually different,
   wherein the first electrode and the second electrode are separated by a gap, and a width of the gap in the first direction is less than a width of one of the first, the second, the third, and the fourth alignment regions in the first direction.

2. The array substrate according to claim 1, wherein the first electrode further comprises:
   a plurality of first branch electrodes, disposed in the first alignment region, wherein an end of each of the plurality of first branch electrodes is connected to the first main electrode and the other end is far away from the first main electrode, and the first branch electrodes extend towards a third direction; and
   a plurality of second branch electrodes, disposed in the second alignment region, wherein an end of each of the plurality of second branch electrodes is connected to the first main electrode and the other end is far away from the first main electrode, and the second branch electrodes extend towards a fourth direction, wherein the third direction is different from the fourth direction.

3. The array substrate according to claim 2, wherein at least one of the first branch electrodes and one of the second branch electrodes are disposed correspondingly and form a V-shaped structure.

4. The array substrate according to claim 2, wherein the second electrode further comprises:
   a plurality of third branch electrodes, disposed in the third alignment region, wherein a first end of each of the plurality of third branch electrodes is connected to the second main electrode and a second end of each of the plurality of third branch electrodes is far away from the second main electrode, and the third branch electrodes extend towards a fifth direction; and
   a plurality of fourth branch electrodes, disposed in the fourth alignment region, wherein an end of each of the plurality of fourth branch electrodes is connected to the second main electrode and the other end is far away from the second main electrode, and the fourth branch electrodes extend towards a sixth direction, wherein the fifth direction is different from the sixth direction.

5. The array substrate according to claim 4, wherein the third direction and the sixth direction are opposite each other, and the fourth direction and the fifth direction are opposite each other.

6. The array substrate according to claim 4, wherein the first branch electrodes and the second branch electrodes are mirror symmetric with respect to the first main electrode, and the third branch electrodes and the fourth branch electrodes are mirror symmetric with respect to the second main electrode.

7. The array substrate according to claim 1, wherein a reflected pattern of the first electrode along the signal lines is same as a pattern of the second electrode.

8. The array substrate according to claim 1, further comprising at least one connection line, electrically connected to the first electrode and the second electrode of the pixel electrodes.

9. The array substrate according to claim 1, further comprising at least one first auxiliary electrode, disposed on the substrate and disposed in one of the pixel regions, wherein the first auxiliary electrode is disposed between the first electrode and the second electrode, and the first auxiliary electrode is separate from the first electrode and the second electrode in the one of the pixel regions.

10. The array substrate according to claim 1, further comprising at least one thin-film transistor, disposed on the substrate and disposed in one of the pixel regions, wherein the at least one thin-film transistor is electrically connected to the pixel electrodes in the one of the pixel regions.

11. The array substrate according to claim 1, wherein the first electrode further comprises a third main electrode extending in the first direction and the third main electrode is connected to the first main electrode, and the second electrode further comprises a fourth main electrode extending in the first direction and the fourth main electrode is connected to the second main electrode.

12. The array substrate according to claim 11, wherein the first electrode further comprises:
   a plurality of first branch electrodes, disposed in the first alignment region, wherein a first end of each of plurality of first branch electrodes is connected to the first main electrode or the third main electrode and a second end first end of each of plurality of first branch electrodes is far away from the first main electrode and the third main electrode, and the first branch electrodes extend towards a third direction; and
   a plurality of second branch electrodes, disposed in the second alignment region, wherein an end of each of plurality of second branch electrodes is connected to the first main electrode or the third main electrode and the other end is far away from the first main electrode and the third main electrode, and the second branch electrodes extend towards a fourth direction, wherein the third direction is different from the fourth direction; and
   the second electrode further comprises:
      a plurality of third branch electrodes, disposed in the third alignment region, wherein an end of each of plurality of third branch electrodes is connected to the second main electrode or the fourth main electrode and the other end is far away from the second main electrode and the fourth main electrode, and the third branch electrodes extend towards a fifth direction; and a plurality of fourth branch electrodes, disposed in the fourth alignment region, wherein an end of each of plurality of fourth branch electrodes is connected to the second main electrode or the fourth main electrode and the other end is far away from the second main electrode and the fourth main electrode, and the fourth branch electrodes extend towards a sixth direction, wherein the fifth direction is different from the sixth direction.

13. A curved liquid crystal display panel, having a display surface, comprising:

the array substrate of claim 1;

an opposite substrate, disposed opposite the array substrate;

a liquid crystal layer, disposed between the array substrate and the opposite substrate, wherein the liquid crystal layer comprises a plurality of liquid crystal molecules; and a common electrode, disposed on the opposite substrate, wherein the common electrode is disposed between the liquid crystal layer and the opposite substrate.

14. The curved liquid crystal display panel according to claim 13, wherein the display surface is a curved arc surface.

15. The curved liquid crystal display panel according to claim 13, further comprising at least one light-shielding protrusion disposed on the opposite substrate, wherein the light-shielding protrusion extends in a second direction, and the light-shielding protrusion is disposed corresponding to the gap located between the first electrode and the second electrode.

16. The curved liquid crystal display panel according to claim 13, wherein two adjacent signal lines are located on two sides of one pixel region in the second direction.

17. The curved liquid crystal display panel according to claim 16, further comprising at least one second auxiliary electrode disposed on one of the signal lines, and the second auxiliary electrode is separate from the pixel electrodes.

18. The curved liquid crystal display panel according to claim 13, wherein the liquid crystal molecules are correspondingly disposed in the first, the second, the third, and the fourth alignment regions respectively, the liquid crystal molecules of the first alignment region incline towards the first main electrode in a first inclination direction, the liquid crystal molecules of the second alignment region incline towards the first main electrode in a second inclination direction, the liquid crystal molecules of the third alignment region incline towards the second main electrode in a third inclination direction, the liquid crystal molecules of the fourth alignment region incline towards the second main electrode in a fourth inclination direction, and the first inclination direction, the second inclination direction, the third inclination direction, and the fourth inclination direction are different from each other.

19. The curved liquid crystal display panel according to claim 18, wherein an azimuth angle of the first inclination direction and an azimuth angle of the fourth inclination direction is differed 170 degrees to 190 degrees, and an azimuth angle of the second inclination direction and an azimuth angle of the third inclination direction is differed 170 degrees to 190 degrees.

20. The curved liquid crystal display panel according to claim 18, wherein an azimuth angle of the first inclination direction and an azimuth angle of the second inclination direction is differed 90 degrees, and an azimuth angle of the third inclination direction and an azimuth angle of the fourth inclination direction is differed 90 degrees.

* * * * *